(12) United States Patent
Shindoh

(10) Patent No.: US 7,101,049 B2
(45) Date of Patent: Sep. 5, 2006

(54) PROJECTOR OPTICS AND PROJECTOR WITH LIGHT SOURCE OF LEDS

(75) Inventor: Mikio Shindoh, Ageo (JP)

(73) Assignee: Tamron Co., Ltd., Saitama (JP)

( * ) Notice: Subject to any disclaimer, the term of this patent is extended or adjusted under 35 U.S.C. 154(b) by 117 days.

(21) Appl. No.: 10/980,830

(22) Filed: Nov. 4, 2004

(65) Prior Publication Data
US 2005/0128730 A1 Jun. 16, 2005

(30) Foreign Application Priority Data
Nov. 4, 2003 (JP) ............................. 2003-374539

(51) Int. Cl.
*G03B 21/28* (2006.01)
(52) U.S. Cl. ...................... 353/81; 353/94; 353/20; 362/227; 362/231; 362/234; 359/634
(58) Field of Classification Search ................. 353/20, 353/30, 31, 94; 362/612, 613, 555, 561, 362/227, 231, 234, 800; 359/638, 639, 640
See application file for complete search history.

(56) References Cited

U.S. PATENT DOCUMENTS

| | | | |
|---|---|---|---|
| 6,139,166 A * | 10/2000 | Marshall et al. ............ | 362/231 |
| 6,700,711 B1 * | 3/2004 | Nalwa ......................... | 359/725 |
| 2004/0109329 A1 * | 6/2004 | Kato ........................... | 362/555 |
| 2005/0219464 A1 * | 10/2005 | Yamasaki et al. ............. | 353/20 |
| 2005/0248733 A1 * | 11/2005 | Sakata et al. ................. | 353/94 |
| 2005/0254018 A1 * | 11/2005 | Magarill et al. .............. | 353/94 |
| 2006/0001842 A1 * | 1/2006 | Engle ........................... | 353/94 |
| 2006/0028816 A1 * | 2/2006 | Lee et al. .................... | 362/231 |
| 2006/0044795 A1 * | 3/2006 | Tatsuno ....................... | 362/231 |

FOREIGN PATENT DOCUMENTS

| | | |
|---|---|---|
| JP | 2000021532 A | 1/2000 |
| JP | 2001249400 A | 9/2001 |
| JP | 2002244211 A | 8/2002 |

* cited by examiner

*Primary Examiner*—William C. Dowling
(74) *Attorney, Agent, or Firm*—Jacobson Holman PLLC

(57) ABSTRACT

The invention is directed to downsized projector optics and projector both of which employ an LED light source attaining the enhanced efficiency of the quantity of the emitted light. The projector optics and the projector respectively include, in position, a polygon-based conical polyhedron prism of which reflection surfaces are opposed to the LED light source; a light tunnel, a PS converting element, a polarized beam splitter and a LCOS all of which are provided in the optical axis of the reflected light from the polygon-based conical polyhedron prism; and a projection lens placed in the optical axis of the transmitted light from the polarized beam splitter.

3 Claims, 4 Drawing Sheets

PROJECTOR OPTICS AND PROJECTOR WITH LIGHT SOURCE OF LEDS

FIELD OF THE INVENTION

The present invention relates to a projector optics and a projector both of which has a light source of LEDs.

BACKGROUND ART

A light emitting diode, namely, an LED, is commonly used as a light source for an image projecting apparatus, or namely a projector, because of its properties of reduced power consumption and heat release, decreased dimensions, and extended lifetime, as will be described below.

A downsized imaging apparatus has been proposed which is provided with an illumination apparatus consisting of light source of a plurality of low power light emitting elements, an illumination uniformizing means for making beams from the light source homogenous to overlap them onto a light valve, and a polarization converter converting light from the light source in polarization phase suitable to the light valve to raise efficiency of the illumination apparatus, where the illumination apparatus is used along with a projection means to direct rays of three primary colors at the screen (see Patent Document 1).

Another LED light projector is a projector display apparatus having a light source, a light modulator modulating light from the light source, and a projection lens projecting modulated incident light from the light modulator, where the light source is of light emitting elements deployed in arrays, and a light diffusing means is provided to direct beams emitted individually from the light emitting elements throughout the light modulation region on the light modulator (see Patent Document 2).

Still another LED light projector is an image projector that includes a dichroic prism synthesizes trichromatic rays of red, green, and blue emitted from light emitting diodes to illuminate a liquid crystal light valve, and that also includes polarized beam irradiating elements that make beams from the light emitting diodes homogeneous in polarization to illumine the liquid crystal light valve, and the polarized beam irradiating elements function as a polarizer to uniformize polarized incident light upon a polarized beam splitter, namely, upon the liquid crystal light valve, and also as an emitted light analyzer, thereby enabling a projection lens to direct the beams modulated on the liquid crystal light valve at the screen (see Patent Document 3).

LIST OF REFERENCES CITED ABOVE

Patent Document 1: Japanese Patent Laid-Open Publication No. 2000-21532
Patent Document 2: Japanese Patent Laid-Open Publication No. 2001-249400
Patent Document 3: Japanese Patent Laid-Open Publication No. 2002-244211

In the imaging apparatus disclosed in the above-mentioned Patent Document 1, the dichroic that is expensive is essential, and about a half of the quantity of the emitted light is lost as the polarization planes are not uniform in the same dimensions which is because the imaging apparatus is not provided with a p/s converting element. Additionally, the absence of a fly-eye lens that serves as an integrator results in an illumination distribution Y adversely getting uneven in the screen.

In the projection display apparatus disclosed in the above-mentioned Patent Document 2, the illumination distribution in the screen is improved by means of the fly-eye lens, compared with that set forth in the cited Patent Document 1, but an cost increase due to the dichroic prism and the loss of the quantity of the emitted light because of the absence of the p/s converting element are not improved.

In the image projector disclosed in the above-mentioned Patent Document 3, the loss of the quantity of the emitted light is reduced by means of the p/s converting element, but the dichroic prism and three of the p/s converting elements incorporated in the projector causes a cost increase while the illumination distribution is not improved.

Accordingly, the present invention is made to overcome the aforementioned disadvantages in the prior art projectors using LEDs for the light sources, and it is an object of the present invention to provide downsized projector optics and projector both of which employ an LED light source attaining the enhanced efficiency of the quantity of the emitted light.

SUMMARY OF THE INVENTION

The present invention is directed to a projector optics incorporating an LED light source therein, and the projector optics includes, in position, a polygon-based conical polyhedron prism of which reflection surfaces are opposed to the LED light source; a light tunnel, a PS converting element, a polarized beam splitter and a LCOS all of which are provided in the optical axis of the reflected light from the polygon-based conical polyhedron prism; and a projection lens placed in the optical axis of the transmitted light from the polarized beam splitter.

In one aspect of the present invention, the polygon-based conical polyhedron prism is a pyramid-shaped prism, and the LED light source is comprised of a white LED, a green LED, a blue LED, and a red LED.

The present invention is also directed to a projector incorporating an LED light source therein, and the projector includes, in position, a polygon-based conical polyhedron prism of which reflection surface is opposed to the LED light source; a light tunnel, a PS converting element, a polarized beam splitter and a LCOS all of which are provided in the optical axis of the reflected light from the polygon-based conical polyhedron prism; and a projection lens placed in the optical axis of the transmitted light from the polarized beam splitter.

In accordance with the present invention, there are provided downsized projector optics and projector both of which employ an LED light source attaining the enhanced efficiency of the quantity of the emitted light.

DETAILED DESCRIPTION OF THE INVENTION

Best Mode of the Invention

Figure 1:
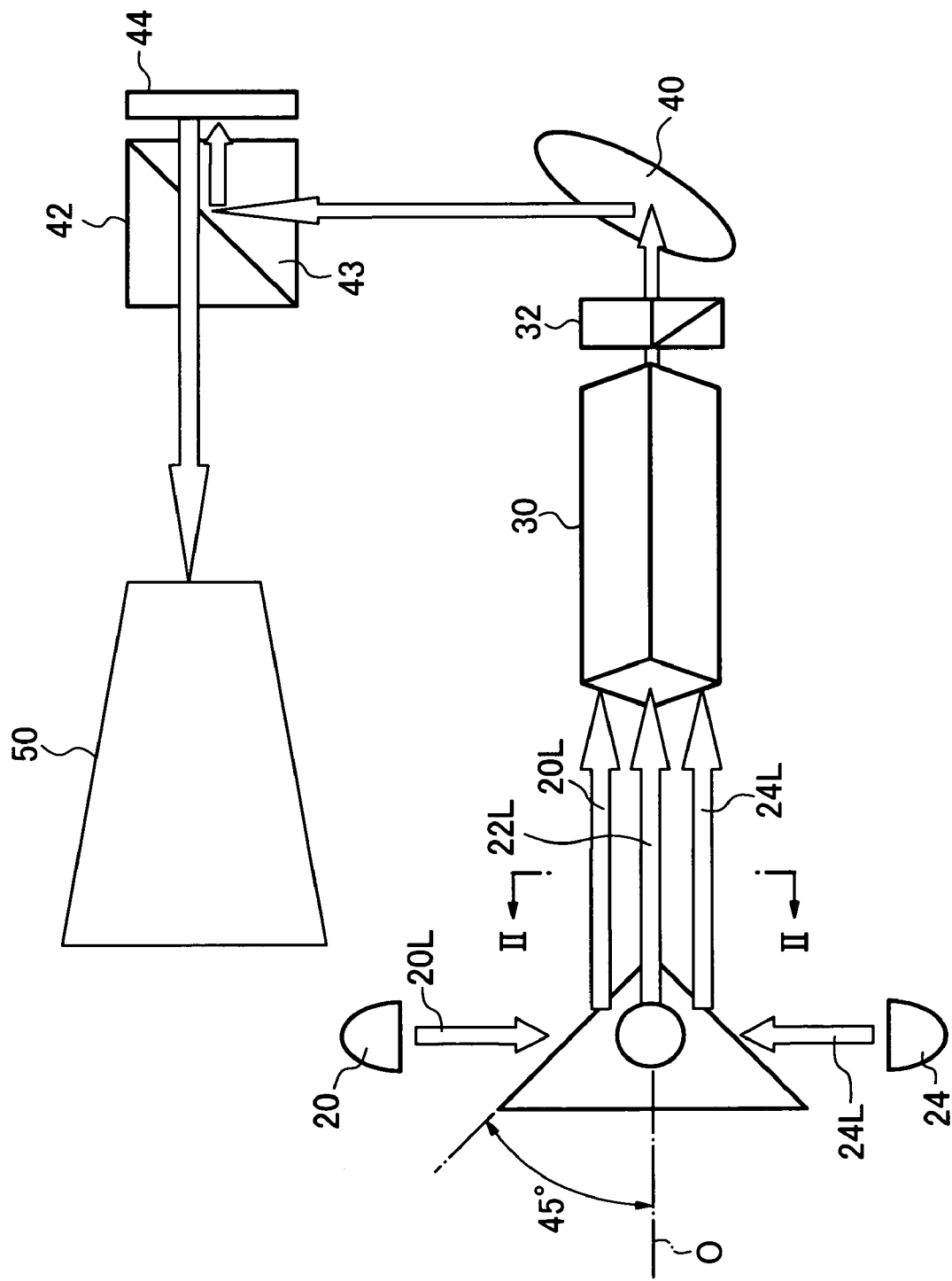
FIG. 1 is a side view illustrating an embodiment of an LED light source projector optics according to the present invention.
Figure 2:
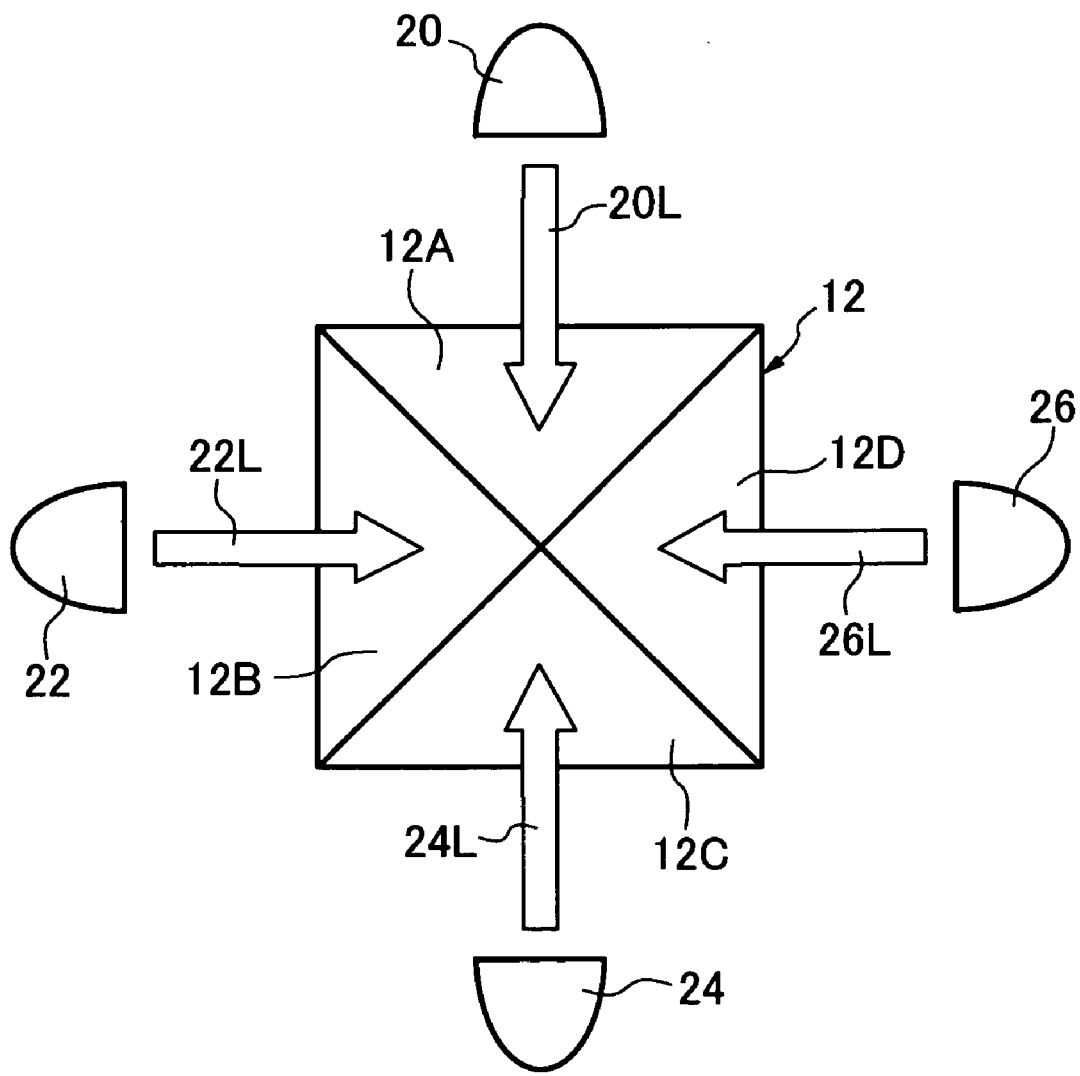
FIG. 2 is a diagram taken along line II—II of FIG. 1.

An exemplary projector optics incorporating an LED light source according to the present invention will now be described. As shown in FIGS. 1 and 2, the projector optics 10 includes, in position, a pyramid-shaped prism 12 of which reflection surfaces 12A, 12B, 12C and 12D are opposed to white, green, glue and red LEDs 20, 22, 24 and 26, respectively emitting white colored light 20L, green colored light 22L, blue colored light 24L and red colored light 26L. Positions of the white, green, blue and red LEDs 20, 22, 24 and 26 are determined so that their respective reflection surfaces 12A, 12B, 12C and 12D reflect light in parallel with the optical axis O.

Right ahead of the pyramid-shaped prism 12, a light tunnel 30 is positioned to make light intensity uniform, and further ahead of it, there is a PS converting element 32 that serves to selectively determine polarization properties. Still ahead of the PS converting element 32, with a surface reflection mirror 40 interposed, a polarized beam splitter 42 and an LCOS 44 are located. The polarized beam splitter 42 has a polarized beam reflection surface 43 that reflects P polarized beams but transmits S polarized beams. Light flux reflected by the polarized beam splitter 42 and imaged by the LCOS 44 is transmitted through the polarized beam splitter 42 again to be directed as an incident light on a projection lens 50 positioned ahead of the polarized beam splitter 42.

The pyramid-shaped prism 12 makes an angle of 90 degrees at its apex point which means that the incident light and the resultant reflected light are orthogonal to each other. Alternatively, the above-mentioned LED light source projector optics 10 may be downsized by an arrangement where the apex angle of the pyramid-shaped prism 12 is smaller than 90 degrees to direct emitted beams from the white, green, blue and red LEDs 20, 22, 24 and 26 in a slanting direction opposite to the light tunnel 30 rather than in the direction orthogonal to the optical axis O.

The rectangle-based pyramid prism 12 may be replaced with other polygon-based conical polyhedron prisms such as a triangular pyramid prism and a hexangular pyramid prism, allowing for the number of LEDs used as the light source.

Figure 3:
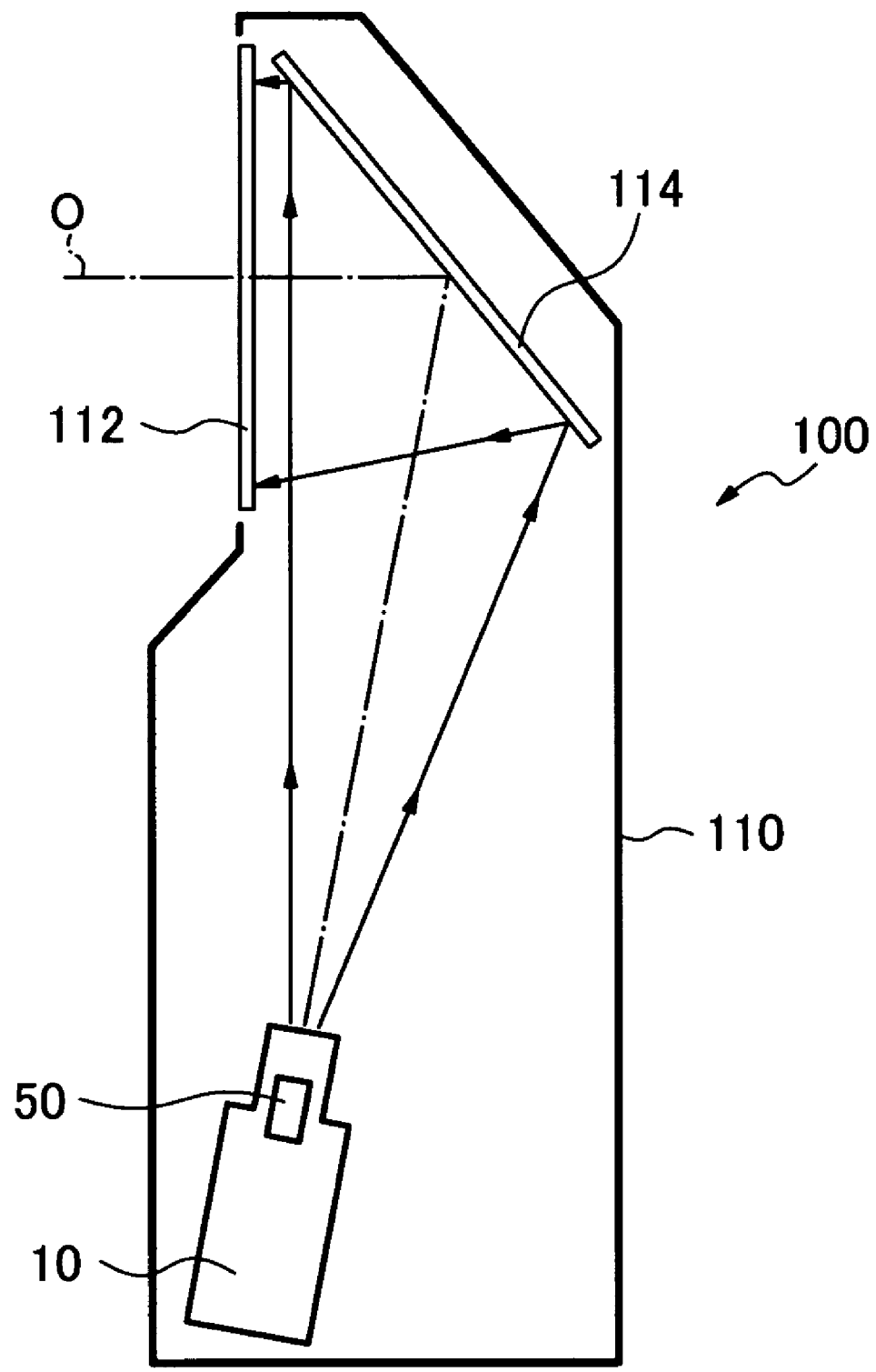
FIGS. 3 and 4 are sectional views respectively illustrating an embodiment of an LED light source projector according to the present invention.

An exemplary projector 100 incorporating an LED light source according to the present invention, as shown in FIG. 3, includes the LED light source projector optics 10, a transmission screen 112, and a plane reflector 114 respectively in positions. The optical axis of reflected light from the plane reflector 114 is transmitted through the transmission screen 112 perpendicular to the same. Thus, the present LED light source projector 100 becomes relatively compact and suitable to a face-to-face condition where the user stands right in front of the projector.

Figure 4:
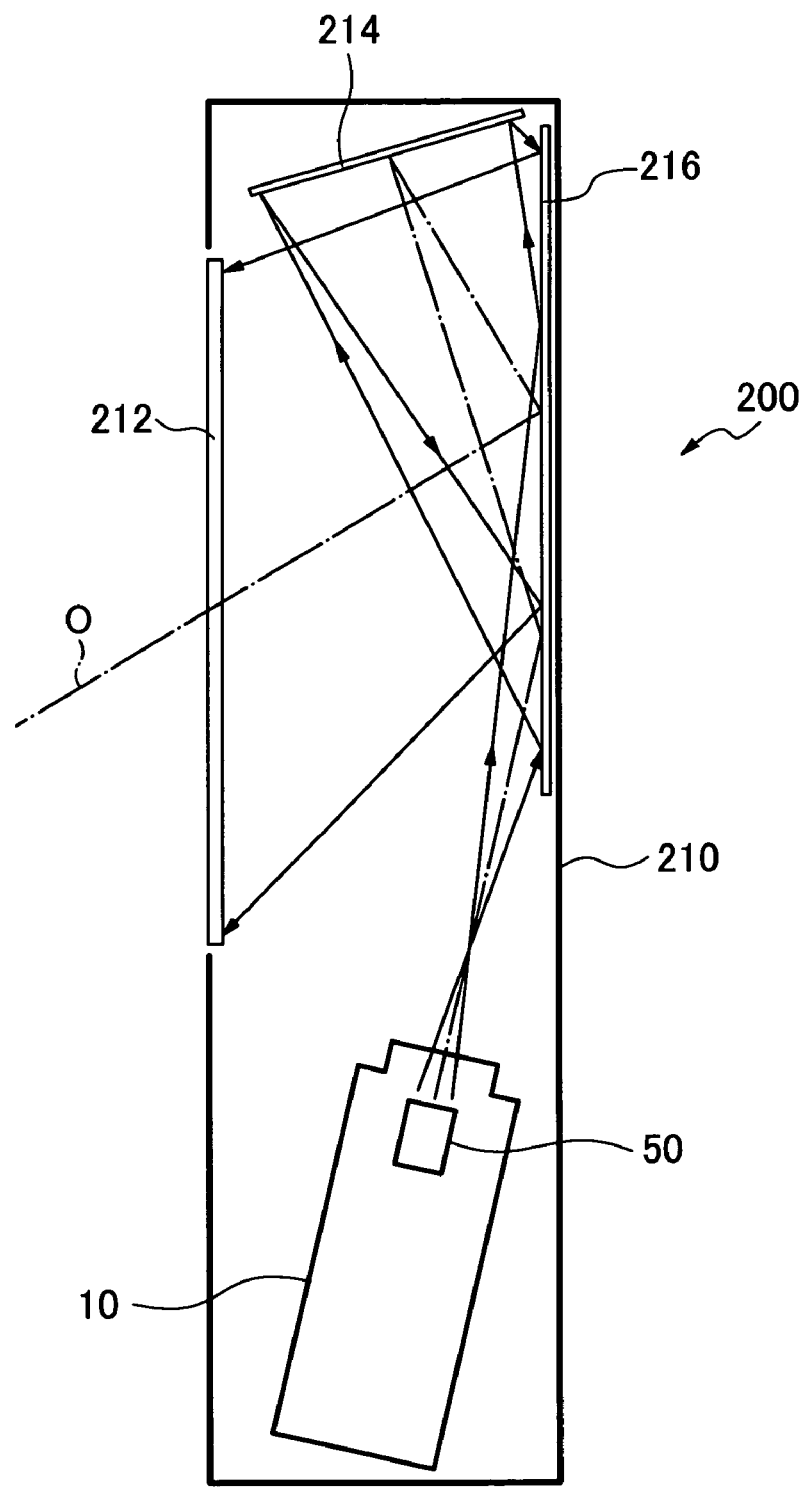

Another exemplary projector 200 incorporating an LED light source according to the present invention, as shown in FIG. 4, includes a housing 210 which contains the LED light source projector optics 10, a transmission screen 212, first and second plane reflectors 214 and 216 respectively in positions. The optical axis of reflected light from the second plane reflector 216 is transmitted through the transmission screen 212, slanting downward. Thus, the present LED light source projector 200 becomes relatively large and suitable to a looking-up condition where the user stands in a lower position.

What is claimed is:

1. A projector optics incorporating an LED light source therein, including, in position, a polygon-based conical polyhedron prism of which reflection surfaces are opposed to the LED light source; a light tunnel, a PS converting element, a polarized beam splitter and a LCOS all of which are provided in the optical axis of the reflected light from the polygon-based conical polyhedron prism; and a projection lens placed in the optical axis of the transmitted light from the polarized beam splitter.

2. A projector optics according to claim 1, wherein the polygon-based conical polyhedron prism is a pyramid-shaped prism, and the LED light source is comprised of a white LED, a green LED, a blue LED, and a red LED.

3. A projector incorporating an LED light source therein, including, in position, a polygon-based conical polyhedron prism of which reflection surface is opposed to the LED light source; a light tunnel, a PS converting element, a polarized beam splitter and a LCOS all of which are provided in the optical axis of the reflected light from the polygon-based conical polyhedron prism; and a projection lens placed in the optical axis of the transmitted light from the polarized beam splitter.

* * * * *